(12) United States Patent
Hughes et al.

(10) Patent No.: US 6,576,153 B2
(45) Date of Patent: Jun. 10, 2003

(54) HYDROFLUOROCARBON REFRIGERANTS FOR USE IN CENTRIFUGAL CHILLERS

(75) Inventors: H. Michael Hughes, Erie County, NY (US); Mark W. Spatz, Erie County, NY (US); Rajiv Ratna Singh, Erie County, NY (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/840,348

(22) Filed: Apr. 23, 2001

(65) Prior Publication Data

US 2002/0003224 A1 Jan. 10, 2002

Related U.S. Application Data

(63) Continuation of application No. 09/517,055, filed on Mar. 2, 2000, now abandoned, which is a continuation of application No. 09/313,591, filed on May 18, 1999, now abandoned, which is a continuation of application No. 09/097,544, filed on Jun. 15, 1998, now abandoned, which is a continuation-in-part of application No. 08/697,936, filed on Sep. 3, 1996, now abandoned.

(60) Provisional application No. 60/003,741, filed on Sep. 14, 1995.

(51) Int. Cl.$^7$ .............................. C09K 5/04; F25B 1/10
(52) U.S. Cl. .............................. 252/67; 62/114; 62/502
(58) Field of Search .............................. 252/67; 62/114, 62/502

(56) References Cited

U.S. PATENT DOCUMENTS 5,558,810 A * 9/1996 Minor et al. .................. 252/67

FOREIGN PATENT DOCUMENTS

WO WO 93/02150 * 2/1993

OTHER PUBLICATIONS

Derwent WPI Abstract; WPI Accession No.: 90–373625/50 for JP 2272086, Nov. 1990.*
N. Dean Smith, "New Chemical Alternatives for CFCs and HCFCs" EPS–600/F–92–012, Mar. 24, 1992.*
J.R. Sand and S.K. Fischer. "Modeled Performance of Non–Chlorinated Substitutes for CFC–11 and CFC–1112 in Centrifugal Chillers," International Journal of Refrigeration, vol. 17, No. ! (Jan. 1, 1994) p 40.*
N. Dean Smith, "Evaluation of HFC–245fa as a Potential Alternative for CFC–11 in Low Pressure Chillers" 1994 International CFC and Halon Alternatives Conference, Oct. 24–26, 1994, Washington, D.C. pp. 894–901.*
Sand et al., "Modeled Performance of Non–chlorinated Substitutes for CFC–11 and CFC–12 in Centrifugal Chillers," presented at International CFC aaaand Halon Alternatives Conference, Dec. 3–5, 1991 (Baltimore, Maryland) PP 406–415.*

* cited by examiner

Primary Examiner—Margaret Einsmann
(74) Attorney, Agent, or Firm—Colleen D. Szuch

(57) ABSTRACT

This invention relates to hydrofluorocarbons useful in refrigeration and heat pump applications. The invention provides hydrofluorocarbons selected from the group of 1,1,2,3,3-pentafluoropropane, 1,1,1,3,3-pentafluoropropane, 1,1,1,2,3-pentafluoropropane, and mixtures thereof that are environmentally suitable replacements for chlorofluorocarbons in refrigeration applications such as multi-stage centrifugal chillers.

11 Claims, 1 Drawing Sheet

HYDROFLUOROCARBON REFRIGERANTS FOR USE IN CENTRIFUGAL CHILLERS

CROSS REFERENCE TO RELATED APPLICATIONS

Figure 1:
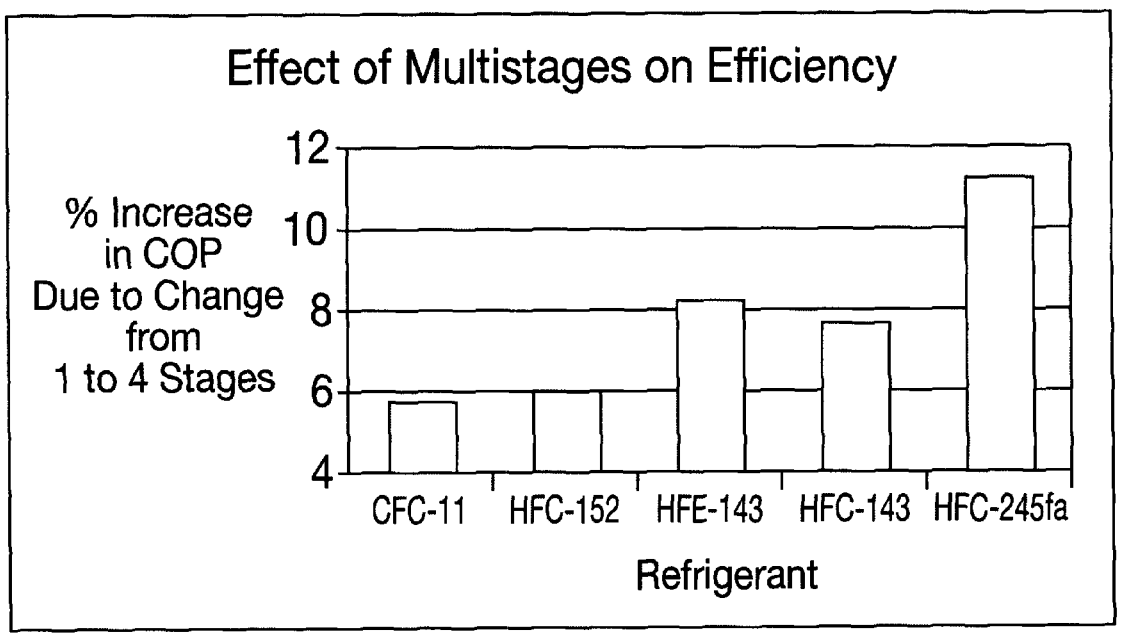

This application is a continuation of U.S. patent application Ser. No. 09/517,055, filed Mar. 2, 2000, abandoned which is a continuation of U.S. patent application Ser. No. 09/313,591, filed May 18, 1999, now abandoned, which, in turn, is a continuation of U.S. patent application Ser. No. 09/097,544, Jun. 15, 1998 abandoned which is a C.I.P. of Ser. No. 08/697,936, filed Sep. 3, 1996, now abandoned which claims benefit of Ser. No. 06/003,741 filed on Sep. 14, 1995.

FIELD OF THE INVENTION

This invention relates to hydrofluorocarbons useful in refrigeration and heat pump applications as well as foam blowing agents. More specifically, the invention provides hydrofluorocarbons that are environmentally desirable replacements for chlorofluorocarbons and hydrochlorofluorocarbons in refrigeration applications, such as centrifugal chillers, particularly multi-stage centrifugal chillers, and foam blowing agent applications.

BACKGROUND OF THE INVENTION

Fluorocarbon based fluids have found widespread use in industry for refrigeration applications such as air conditioning and heat pump applications.

Vapor compression is one type of refrigeration. In its simplest form, vapor compression involves changing the refrigerant from the liquid to the vapor phase through heat absorption at a low pressure and then from the vapor to the liquid phase through heat removal at an elevated pressure.

While the primary purpose of refrigeration is to remove energy at low temperature, the primary purpose of a heat pump is to add energy at higher temperature. Heat pumps are considered reverse cycle systems because, for heating, the operation of the condenser is interchanged with that of the refrigeration evaporator.

Vapor compression is one type of refrigeration. In its simplest form, vapor compression involves changing the refrigerant from the liquid to the vapor phase through heat absorption at a low pressure and then from the vapor to the liquid phase through heat removal at an elevated pressure.

The art is continually seeking new fluorocarbon based refrigerants and blowing agents that offer alternatives to fluids currently in use. Of particular interest as alternatives are fluorocarbon based compositions that are considered to be environmentally safe substitutes Ideally, replacement refrigerant compositions possess those properties unique to the composition being replaced including chemical stability, low toxicity, non-flammability, and efficiency-in-use. The latter characteristic is important in refrigeration and air-conditioning applications especially where a loss in refrigerant thermodynamic performance or energy efficiency may have secondary environmental impacts through increased fossil fuel usage arising from an increased demand for electrical energy. Furthermore, the ideal substitute would not require major engineering changes to conventional equipment currently used.

Certain chlorofluoromethane and chlorofluoroethane derivatives have gained widespread use in refrigeration applications including air conditioning and heat pump applications owing to their unique combination of chemical and physical properties. The majority of refrigerants utilized in vapor compression systems are either single component fluids or azeotropic mixtures. Moreover, certain applications, such as centrifugal chillers, and in particular multi-stage centrifugal chillers, can only use pure or azeotropic refrigerants, since nonazeotropic mixtures will separate in pool boiling evaporators, causing undesirable performance.

Previously, 1,1,2,2,3-pentafluoropropane, HFC-245ca, has been proposed as an alternative to 1,1-dichloro-2,2,2-trifluoroethane, R-123, and trichlorofluoromethane, R-11. See N. D. Smith et al., "R-245ca: A Potential Far Term Alternative For R-11", 35 ASHRAE J. 19–23 (1993). The present invention provides additional compounds and compositions that are suitable replacements for R-11 and, in addition, may be used as foam blowing agents.

Mathematical models have substantiated that hydrofluorocarbons, such as 1,1,1,3,3-pentafluoropropane (HFC-245fa), will not adversely affect atmospheric chemistry, being a negligible contributor to ozone depletion and to green-house global warming in comparison to the fully halogenated species.

DESCRIPTION OF THE INVENTION

In accordance with the invention, it has been discovered that the compounds 1,1,1,2,3-pentafluoropropane ("HFC-245eb"), 1,1,1,3,3-pentafluoropropane ("HFC-245fa"), 1,1,2,3,3-pentafluoropropane ("HFC-245ea"), and mixtures thereof are useful as refrigerants, heat transfer fluids, and blowing agents. More specifically it has been discovered that these compounds and mixtures meet the need for a nonflammable refrigerant which has a low ozone depletion potential and is a negligible contributor to green-house global warming compared with currently used refrigerants, such as R-11 and 123. Further, it has been discovered that these compounds and mixtures have COPs and capacities that render them suitable for use in refrigeration applications, including in centrifugal chillers, and particularly in multi-stage centrifugal chillers. Also, the compounds and mixtures of the invention exhibit low compressor discharge temperatures.

It has been discovered that the refrigerant HFC-245fa shows unexpected increase in efficiency (also known as coefficient of performance or COP) when compared to CFC-11 in its performance in multi-stage centrifugal chillers.

In one embodiment, the invention provides a method for producing refrigeration using a compound selected from HFC-245eb, HFC-245fa, HFC-245ea, and mixtures thereof In still another embodiment, a method for producing refrigeration using a centrifugal chiller is provided using a compound selected from HFC-245eb, HFC-245fa, HFC-245ea, and mixtures thereof In a preferred embodiment, a method for producing refrigeration using a multi-stage centrifugal chiller is provided using a compound selected from HFC-245eb, HFC-245fa, HFC-245ea, and mixtures thereof In a most preferred embodiment, a method for producing refrigeration using a multi-stage centrifugal chiller is provided wherein HFC-245fa is the refrigerant.

In another embodiment of the invention, a method for producing beating is provided using a compound selected from HFC-245eb, HFC-245fa, HFC-245ea, and mixtures thereof For purposes of this invention, by mixtures is meant both nonazeotropic and azeotrope-like compositions of at least two of the compounds.

Thus, in yet another embodiment, this invention provides azeotrope-like compositions comprising effective amounts of at least two compounds selected from HFC-245eb, HFC-245fa, and HFC-245ea. By effective amount is meant an amount of each component that, when combined with the other component, results in the formation of an azeotrope or azeotrope-like mixture. Preferably, the invention provides azeotrope-like compositions comprising from about 10 to about 90 weight percent 245fa and from about 90 to about 10 weight percent 245ea, the compositions having a boiling point 25° C. ±7° C. at 760 mm Hg. More preferably, the composition comprises from about 30 to about 70 weight percent HFC-245fa and from about 70 to about 30 weight percent HFC-245ea, more preferably about 50 weight percent HFC-245fa and about 50 weight percent HFC-245ea.

For purposes of the invention, by centrifugal chillers is meant refrigeration equipment that uses centrifugal compression to convert the refrigerant gas from low to high pressure. Compression may be performed in a single stage or multiple stages. Preferably the multi-stage operation of the process comprises from about two to about five, more preferably about two to about four and most preferably about two to about three stages of compression. The precise number of stages is application dependent and can be determined without undue experimentation.

For purposes of this invention, azeotrope-like compositions are compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the state pressure and temperature. In practice, this means that the components of an azeotropic mixture are constant boiling and cannot be separated during a phase change.

Azeotrope-like compositions behave like azeotropic mixtures, i.e., or are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with nonazeotrope-like compositions in which, during boiling or evaporation, the liquid composition changes to a substantial degree.

The compounds and mixtures of the invention may be used in a method for producing refrigeration that comprises condensing a refrigerant and thereafter evaporating the refrigerant in the vicinity of a body to be cooled. Alternatively, the compounds and mixtures of the invention may be used in a method for producing heating which comprises condensing a refrigerant in the vicinity of a body to be heated and thereafter evaporating the refrigerant.

In yet another embodiment, the compounds and mixtures of the invention may be used in a method for producing refrigeration using a centrifugal chiller that comprises compressing the compound or mixture of the invention by centrifugal compression and evaporating the refrigerant in the vicinity of a body to be cooled.

In still another embodiment, the compounds and mixtures of the present invention may be used in a method for producing foam comprising blending a heat plasticized resin with a volatile blowing agent comprising the fluids of the present invention and introducing the resin/volatile blowing agent blend into a zone of lower pressure to cause foaming.

In yet another embodiment the compounds and mixtures of the present invention may also be used in a method of dissolving contaminants or removing contaminants from the surface of a substrate which comprises the step of contacting the substrate with the compositions of the present invention. In another embodiment, the compounds and mixtures of the present invention may also be used as fire extinguishing agents.

The compounds and mixtures of the present invention are known materials. Preferably, the materials should be used in sufficiently high purity so as to avoid the introduction of adverse influences upon the cooling or heating properties, constant-boiling properties, or blowing agent properties of the system.

Additional components may be added to the compounds and compositions of this invention to tailor their properties according to the need. For example, in the art, propane and pentane may be added to refrigerant compositions to aid oil solubility and may be added to the fluids of the present invention. Nitromethane may also be added as a stabilizer. Similar materials may be added to the present compositions.

The present invention is more fully illustrated by the following non-limiting examples.

EXAMPLE 1

The critical temperature of HFC-245ea was measured by measuring the temperature where the meniscus between the liquid and vapor phase disappeared and was found to be 193.0° C.

EXAMPLE 2

The liquid density of material HFC-245ea was measured, as a function of temperature, using glass flotation beads of precisely known densities. The following data were obtained:

TABLE 1

| Temperature (C.) | Density (g/cc) |
|---|---|
| 191.10 | 0.69887 |
| 185.86 | 0.79875 |
| 175.99 | 0.89868 |
| 161.26 | 0.99867 |
| 140.05 | 1.09876 |
| 113.75 | 1.19895 |
| 81.00 | 1.29928 |
| 42.74 | 1.39974 |
| −0.27 | 1.50033 |

EXAMPLE 3

The vapor pressure of HFC-245ea was measured by loading a sample of the material in a stainless steel cylinder and placing the cylinder in a temperature controlled bath. The cylinder was connected to a pressure transducer. The following data were obtained:

TABLE 2

| Temperature (C.) | Pressure (psia) |
|---|---|
| 0.00 | 2.50 |
| 12.06 | 4.60 |
| 22.08 | 6.80 |
| 26.10 | 8.30 |
| 39.16 | 14.10 |
| 42.13 | 16.20 |
| 58.92 | 28.30 |

TABLE 2-continued

| Temperature (C.) | Pressure (psia) |
|---|---|
| 76.55 | 48.50 |
| 91.53 | 74.30 |

EXAMPLE 4

The critical temperature of HFC-245eb was measured by measuring the temperature where the meniscus between the liquid and vapor phase disappeared and was found to be 164.90° C.

EXAMPLE 5

The liquid density of material HFC-245eb was measured, as a function of temperature, using glass flotation beads of precisely known densities. The following data were obtained:

TABLE 3

| Temperature (C.) | Density (g/cc) |
|---|---|
| −27.36 | 1.50073 |
| 14.19 | 1.40012 |
| 51.67 | 1.29964 |
| 84.02 | 1.19930 |
| 110.40 | 1.09908 |
| 131.59 | 0.99896 |
| 146.66 | 0.89893 |
| 156.95 | 0.79897 |
| 162.40 | 0.69906 |

EXAMPLE 6

The vapor pressure of HFC-245eb was measured by loading a sample of the material in a stainless steel cylinder and placing the cylinder in a temperature controlled bath. The cylinder was connected to a pressure transducer. The following data were obtained:

TABLE 4

| Temperature (C.) | Pressure (psia) |
|---|---|
| −20.85 | 1.90 |
| −14.89 | 2.60 |
| 0.00 | 5.50 |
| 6.11 | 7.40 |
| 9.66 | 8.60 |
| 15.08 | 10.90 |
| 20.34 | 13.50 |
| 21.13 | 13.90 |
| 23.86 | 15.30 |
| 39.38 | 27.20 |
| 54.69 | 44.80 |
| 67.79 | 66.30 |
| 33.65 | 22.30 |
| 33.57 | 22.20 |
| 40.26 | 27.80 |
| 40.25 | 27.80 |
| 123.68 | 239.50 |
| 140.54 | 330.00 |
| 155.56 | 419.30 |

EXAMPLE 7

The vapor pressure of HFC-245fa was measured by loading a sample of the material in a stainless steel cylinder and placing the cylinder in a temperature controlled bath. The cylinder was connected to a pressure transducer. The following data were obtained:

TABLE 5

| Temperature (C.) | Pressure (psia) |
|---|---|
| −29.10 | 1.83 |
| −20.84 | 2.85 |
| −10.09 | 4.81 |
| 0.01 | 7.88 |
| 12.05 | 13.02 |
| 12.05 | 13.13 |
| 14.05 | 14.22 |
| 14.06 | 14.27 |
| 14.60 | 14.58 |
| 16.34 | 15.62 |
| 20.47 | 18.30 |

EXAMPLE 8

This example shows that HFC-245ea, HFC-245fa and HFC-245eb have certain advantages when compared to other refrigerants which are currently used in certain refrigeration cycles.

The theoretical performance of a refrigerant at specific operating conditions can be estimated from the thermodynamic properties of the refrigerant using standard refrigeration cycle analysis techniques as described, for example, in R C Downing, *Fluorocarbon Refrigerants Handbook,* Chapter 3, Prentice-Hall, 1988. The coefficient of performance, COP is a universally accepted measure, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the volumetric efficiency of the refrigerant. To a compressor engineer, this value expresses the capability of a compressor to pump quantities of heat for a given volumetric flow rate of refrigerant. In other words, given a specific compressor, a refrigerant with a higher capacity will deliver more cooling or heating power.

We have performed this type of calculation for a water chiller refrigeration cycle where the condenser temperature is typically 100° F. and the evaporator temperature is typically 30° F. We have further assumed compression efficiency of 80% in a saturated cycle. The compressor has a displacement of 1000 cubic feet per hour. Such calculations were performed for HFC-245ea, HFC-245eb and HFC-245fa and for R-123. R-123 is presently being used as an alternative for R-11 in centrifugal chillers. Table 6 lists the COP, discharge temperature and capacity of the various refrigerants.

TABLE 6

|  | R-123 | HFC-245fa | HFC-245ea | HFC-245eb |
|---|---|---|---|---|
| COP | 4.90 | 4.74 | 4.94 | 4.82 |
| Capacity (Btu/hr) | 8234 | 12752 | 4937 | 9767 |
| Temp. (discharge, ° F.) | 114 | 103 | 116 | 107 |
| Compression Ratio | 4.58 | 4.48 | 5.66 | 4.76 |

It can be seen that, compared to the existing alternatives to R-11, such as R-123, HFC-245fa and 245eb have higher refrigeration capacity. HFC-245fa and 245eb have lower compression ratios which ratios are advantageous from the point of increased reliability of mechanical machinery in which these refrigerants are likely to be employed. Also, HFC-245ea exhibits higher energy efficiency in comparison to the other fluids.

EXAMPLE 9

Approximately 10 g HFC-245fa were added to the reference and sample arms of a differential ebulliometer to obtain boiling point measurements. See W. Swietoslawski, *Ebulliometric Measurements* (1945). The system was brought to total reflux by gently heating the lower part of the ebulliometer. The temperature of the boiling liquid was measured with reference to pure HFC-245fa using a matched pair of thermistors precise to ±0.01° C. Boiling points were recorded after steady state was attained. Aliquots of HFC-245ea were added to the sample side and the change in boiling temperature noted. Data was obtained up to approximately 42 weight percent of HFC-245ea and indicated that the two components formed a constant boiling composition over a range of compositions of the two components. The boiling point at 760 mm Hg was constant within 20° C. from about 1 to about 27 weight percent HFC-245ea and from about 99 to about 73 weight percent HFC-245fa.

TABLE 7

| Weight Percent 245ea | BP (° C.) | Weight Percent 245ea | BP (° C.) |
|---|---|---|---|
| 0 | 14.5 | 9.7 | 16.0 |
| 0.4 | 14.6 | 10.0 | 16.0 |
| 0.7 | 14.7 | 10.3 | 16.0 |
| 1.1 | 14.7 | 10.6 | 16.0 |
| 1.4 | 14.8 | 10.9 | 16.1 |
| 1.8 | 14.9 | 11.1 | 16.1 |
| 2.1 | 14.9 | 11.4 | 16.2 |
| 2.4 | 15.0 | 11.7 | 16.2 |
| 2.8 | 15.0 | 12.0 | 16.2 |
| 3.1 | 15.1 | 12.3 | 16.2 |
| 3.5 | 15.1 | 12.8 | 16.3 |
| 3.8 | 15.2 | 13.9 | 16.4 |
| 4.1 | 15.2 | 15.0 | 16.5 |
| 4.4 | 15.3 | 17.4 | 16.8 |
| 4.8 | 15.3 | 19.8 | 17.0 |
| 5.1 | 15.4 | 22.0 | 17.2 |
| 5.4 | 15.4 | 24.2 | 17.4 |
| 5.7 | 15.5 | 26.2 | 17.6 |
| 6.1 | 15.5 | 26.2 | 17.6 |
| 6.4 | 15.6 | 28.1 | 17.8 |
| 6.7 | 15.6 | 29.9 | 17.9 |
| 7.0 | 15.6 | 31.6 | 18.1 |
| 7.3 | 15.7 | 33.2 | 18.3 |
| 7.6 | 15.7 | 34.8 | 18.6 |
| 7.9 | 15.7 | 36.3 | 19.2 |
| 8.2 | 15.8 | 37.7 | 19.7 |
| 8.5 | 15.8 | 39.1 | 19.9 |
| 8.8 | 15.9 | 40.4 | 19.9 |
| 9.1 | 15.9 | 41.6 | 20.1 |
| 9.4 | 16.0 | 42.8 | 20.4 |

The data from Table 7 may be compared to the boiling point of the HFC-245fa/HFC-245ea mixture obtained according to Raoult's Law. The comparison, illustrated on Table 8, shows that the actual boiling point does not change as much on the addition of HFC-245ea as is predicted and the mixture, therefore, is unexpectedly constant boiling.

TABLE 8

| Wt % 245fa | Actual BP (° C.) | Raoult's Law BP (° C.) |
|---|---|---|
| 1 | 14.5 | 14.6 |
| 5 | 15.3 | 15.4 |
| 10 | 16.0 | 16.3 |

TABLE 8-continued

| Wt % 245fa | Actual BP (° C.) | Raoult's Law BP (° C.) |
|---|---|---|
| 20 | 17.0 | 18.1 |
| 30 | 17.9 | 20 |
| 40 | 19.8 | 22.1 |
| 50 | 23.2* | 24.4 |

*Extrapolated value.

EXAMPLE 10

From the data of Example 9, the theoretical performance of mixtures of 30/70 weight percent, 50/50 weight percent, and 70/30 weight percent HFC-245fa/HFC-245ea are calculated using the method of Example 8. The calculation is performed for a water chiller refrigeration cycle in which the condenser temperature is typically 100° F. and the evaporator temperature is 30° F. Compression efficiency of 80% in a saturated cycle is assumed. The compressor displacement is 1000 cubic feet per hour. The results are that the compositions have refrigeration capacities closer to R-11 than either of the two components singly and, thus, are suitable replacements for those environmentally undesirable refrigerants currently used in chiller applications.

EXAMPLE 11

This example shows that HFC-245fa has certain advantages when compared to other refrigerants which have been proposed for use in centrifugal water chiller applications.

Centrifugal chillers frequently employ multistage compression combined with interstage intercooling (commonly referred to as an economizer). The use of this cycle modification increases the cycle efficiency. This concept has been used for many years with R-11 and more recently with R-123. The table below demonstrates this effect for several refrigerants.

CFC-11 was chosen as the baseline because the majority of large centrifugal chillers in existing service employ this refrigerant and new non-ozone depleting alternatives are selected on the basis of their suitability as an alternative to CFC-11. HFC-152, 143 and E143 were identified in Sand et al. *Proceedings of International CFC and Halon Alternatives Conference,* Dec. 3–5, 1991, pp. 406–413 as being the only refrigerant alternatives giving COP and kW/t values comparable to R-11.

We have performed this type of calculation for a typical centrifugal water chiller cycle where the condenser temperature is typically 105° F. and the evaporator temperature is typically 40° F. We have further assumed compression efficiency of 75%, superheat and subcooling of 0° F. Such calculations were performed for various number of stages.

TABLE 9

| No. of Stages | CFC-11 | HFC-152 | HFE-143 | HFC-143 | HFC-245fa |
|---|---|---|---|---|---|
| 1 | 5.18 | 5.14 | 5.07 | 5.04 | 4.89 |
| 2 | 5.39 | 5.36 | 5.35 | 5.31 | 5.26 |
| 3 | 5.45 | 5.42 | 5.44 | 5.39 | 5.38 |
| 4 | 5.47 | 5.45 | 5.48 | 5.42 | 5.43 |

The bar graph in FIG. 1 illustrates how HFC-245fa is better suited to multistage operation than CFC-11 or any of the top ranked (by Sand et al) alternatives. CFC-11 and the alternatives selected by Sand all show improvements of about 6 to 8 per cent. The HFC-245fa, however shows an 11 percent gain which is substantially higher than the other refrigerants. The alternatives selected by Sand show an improvement relative to that of CFC-11 ranging from almost zero (HFC-152) to slightly over 2 percent (HFC-143), whereas HFC-245fa shows an improvement of 5.4 percent over CFC-11 which is almost a doubling of that refrigerant.

What is claimed is:

1. A method of producing refrigeration comprising compressing a refrigerant comprising 1,1,1,3,3-pentafluoropropane in a centrifugal chiller, said compressing step being performed in multiple stages.

2. The method of claim 1 wherein the compressing step comprises from about two to about five stages of compression.

3. The method of claim 1 wherein the compressing step comprises from about two to about four stages of compression.

4. The method of claim 1 wherein the compressing step comprises from about two to about three stages of compression.

5. The method of claim 1 wherein the compressing step comprises about two stages of compression.

6. The method of claim 1 wherein the compressing step comprises about three stages of compression.

7. The method of claim 1 wherein the compressing step comprises about four stages of compression.

8. A method of producing refrigeration comprising compressing a refrigerant consisting essentially of 1,1,1,3,3-pentafluoropropane in a multi-stage chiller and thereafter evaporating the refrigerant in the vicinity of a body to be cooled.

9. The method of claim 8 wherein the compressing step comprises from about two to about five stages of compression.

10. The method of claim 9 wherein the compressing step comprises from about two to about four stages of compression.

11. A centrifugal chiller comprising multiple stages for compressing a refrigerant gas and a refrigerant gas consisting essentially of 1,1,1,3,3-pentafluoropropane.

* * * * *